United States Patent
Smiley et al.

(10) Patent No.: US 10,535,025 B2
(45) Date of Patent: Jan. 14, 2020

(54) CRITICALITY PROFILE FOR INDUSTRIAL ASSET

(71) Applicant: ABB Research Ltd., Zurich (CH)

(72) Inventors: Karen J. Smiley, Raleigh, NC (US);
Chihhung Hou, Morrisville, NC (US);
Randall R. Schrieber, Cary, NC (US);
Shakeel M. Mahate, Raleigh, NC (US)

(*) Notice: Subject to any disclaimer, the term of this patent is extended or adjusted under 35 U.S.C. 154(b) by 536 days.

(21) Appl. No.: 13/913,642

(22) Filed: Jun. 10, 2013

(65) Prior Publication Data
US 2014/0365264 A1 Dec. 11, 2014

(51) Int. Cl.
*G05B 23/02* (2006.01)
*G06Q 10/06* (2012.01)

(52) U.S. Cl.
CPC ... *G06Q 10/06315* (2013.01); *G05B 23/0221* (2013.01); *Y02P 90/86* (2015.11)

(58) Field of Classification Search
None
See application file for complete search history.

(56) References Cited

U.S. PATENT DOCUMENTS

| | | | | | |
|---|---|---|---|---|---|
| 5,566,084 | A * | 10/1996 | Cmar | ............... | G05D 23/1902 700/276 |
| 6,581,045 | B1 * | 6/2003 | Watson | ............. | G06Q 30/0283 705/400 |
| 2003/0028269 | A1 * | 2/2003 | Spriggs | ................. | G05B 15/02 700/83 |
| 2006/0025908 | A1 * | 2/2006 | Rachlin | ........................ | 701/29 |
| 2006/0241907 | A1 * | 10/2006 | Armstrong | ......... | G05B 23/0218 702/182 |
| 2007/0162163 | A1 * | 7/2007 | Steinhilper | ........ | G05B 19/4184 700/32 |
| 2007/0162903 | A1 * | 7/2007 | Babb, II | .................... | G06F 8/75 717/154 |
| 2008/0319811 | A1 * | 12/2008 | Casey | ................... | G06Q 10/06 705/7.13 |

(Continued)

OTHER PUBLICATIONS

Int. Search Report cited in PCT Application No. PCT/US2014/041666 dated Oct. 2, 2014, 13 pgs.*

(Continued)

*Primary Examiner* — Ivan R Goldberg
*Assistant Examiner* — Matthew D Henry
(74) *Attorney, Agent, or Firm* — Barnes & Thornburg LLP

(57) ABSTRACT

Among other things, one or more techniques and/or systems are provided for developing a criticality profile of an industrial asset. The criticality profile describes the importance of the industrial asset to a system in terms of one or more criticality metrics and/or one or more confidence profiles. Such metrics may include an operational metric indicative of the operation impact of the industrial asset on a system if the industrial asset remains unchanged or enters a degraded or improved state, a restoration metric indicative of a complexity of restoring the industrial asset to an operational state from the unchanged or degraded state and/or complexity of improving the industrial asset to an improved state, and/or an interdependency metric indicative of a relationship between the industrial asset and one or more other industrial assets and/or between the industrial asset and one or more structures in an environment associated with the industrial asset.

20 Claims, 9 Drawing Sheets

(56) References Cited

U.S. PATENT DOCUMENTS

| | | | |
|---|---|---|---|
| 2009/0089709 A1* | 4/2009 | Baier | G05B 19/409 |
| | | | 715/817 |
| 2014/0278617 A1* | 9/2014 | Kaufman | G06Q 50/06 |
| | | | 705/7.11 |
| 2016/0125068 A1* | 5/2016 | Dongieux | G06Q 10/0633 |
| | | | 707/740 |

OTHER PUBLICATIONS

"Maintenance Strategy Based on a Multicriterion Classifcation of Equipments", Reliability Engineering and System Safety, Elsevier Applied Science, GB, vol. 91, No. 4, Apr. 1, 2006 Felix C. Gomez de Leon Hijes et al, pp. 444-451.*

Penn State, "Power Grid". Archived on Jul. 15, 2010. Retrieved from <https://www.e-education.psu.edu/egee401/content/p5_p4.html> on May 27, 2016.*

"Maintenance Strategy Based on a Multicriterion Classifcation of Equipments", Reliability Engineering and System Safety, Elsevier Applied Science, GB, vol. 91, No. 4, Apr. 1, 2006 Felix C. Gomez de Leon Hijes et al.*

Gomez et al. (Maintenance strategy based on a multicriterion classification of equipments, Gomez et al., Available Online at www.sciencedirect.com on May 6, 2005, pp. 444-451).*

Penn State (Penn State, "Power Grid EGEE 401". Archived on Jul. 15, 2010. 2 pages, Retrieved from <https:// www.e-education.psu.edu/egee401/content/p5_p4.html> on May 27, 2016) (Year: 2010).*

* cited by examiner

CRITICALITY PROFILE FOR INDUSTRIAL ASSET

BACKGROUND

The present application relates to industrial assets and more particularly to systems and/or techniques for determining the importance or criticality of an industrial asset to a system comprising a plurality of industrial assets. The systems and/or techniques find particular application to a power system, but may also find applicability in other industries (e.g., mining, rail system, water distribution, etc.) where it may be useful to analyze data pertaining to the system and/or various industrial assets thereof to identify which industrial assets are most critical, in terms of performance of the system, during a specified time period and which industrial assets are least critical during the specified time period.

A power system comprises a fleet of industrial assets comprising electrical equipment and non-electrical equipment used to generate, supply, transmit, and/or consume or convert electrical power. Electrical equipment of such a system include, among other things, turbines, transformers, circuit breakers, capacitors, voltage regulators, batteries, and power lines, for example. Non-electrical equipment of such a system may include, among other things, storage cabinets, poles, and transmission towers, for example. In some environments, a limited number of resources (e.g., personnel, money, etc.) are available to maintain such a fleet and/or limited operating constraints (e.g., weather condition, knowledge base of crews, etc.) are available to service such a fleet. In other environments, it may be desirable to determine the optimal levels of resources for fleet maintenance. Accordingly, developing a maintenance plan for the power system and/or a subsystem thereof often involves determining how to allocate such resources to achieve a desired impact on the power system (e.g., maximum impact).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to an aspect, a method for developing a first criticality profile for a first industrial asset is provided. The method comprises determining a first criticality metric describing an importance of the first industrial asset to a system comprising the first industrial asset. The method also comprises developing a first criticality profile for the first industrial asset based upon the first criticality metric and.

According to another aspect, a system for developing a first criticality profile for a first industrial asset of a power system is provided. The system comprises a metric component configured to determine a first criticality metric describing an importance of the first industrial asset to the power system. The system also comprises a profile component configured to develop the first criticality profile for the first industrial asset based upon the first criticality metric.

According to yet another aspect, a computer readable medium comprising processor executable instructions that when executed via a processing unit perform a method for developing a criticality profiles for industrial assets is provided. The method comprises developing a first criticality profile for a first industrial asset (e.g., a first transformer) and developing a second criticality profile for a second industrial asset (e.g., a second transformer). The method also comprises developing a third criticality profile for a third industrial asset (e.g., a substation) based upon the first criticality profile and the second criticality profile. The first industrial asset and the second industrial asset are elements of the third industrial asset (e.g., the first transformer and the second transformer are elements of the substation).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
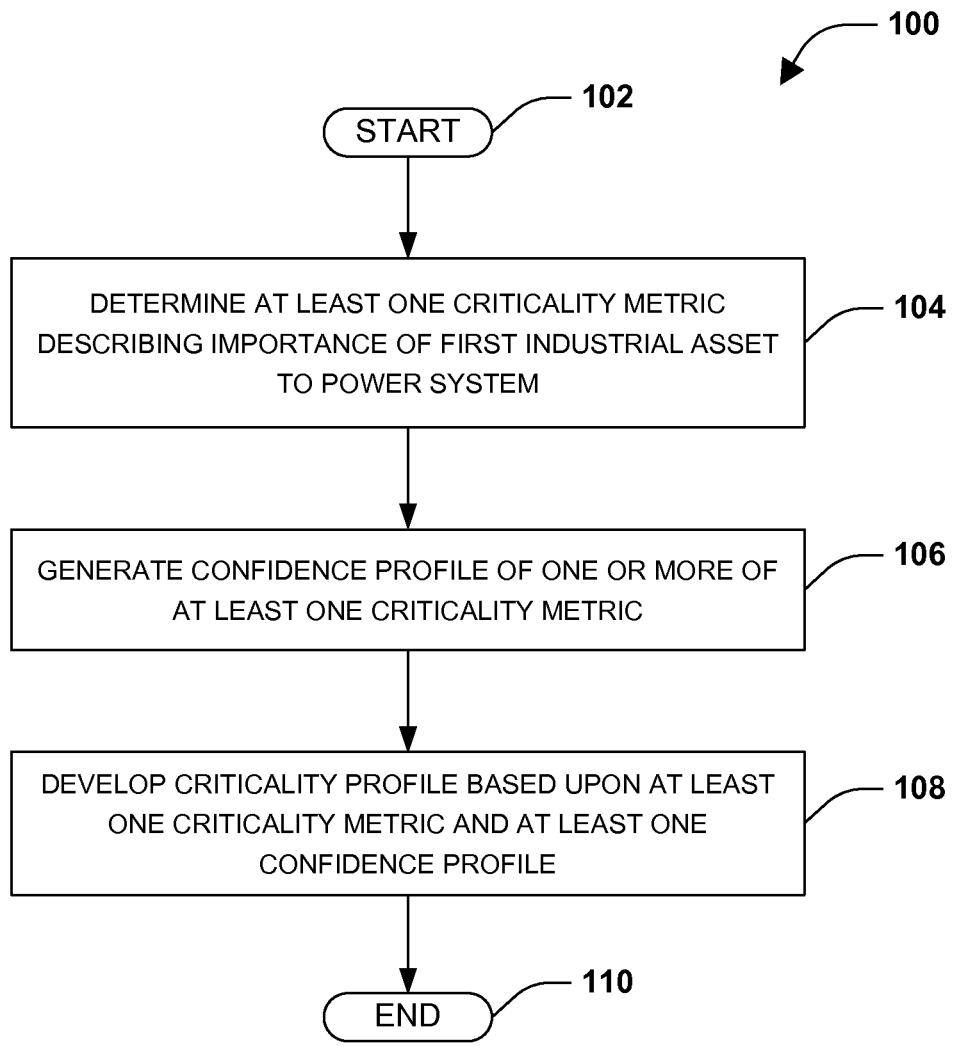
FIG. 1 is a flow diagram illustrating an example method for developing a first criticality profile for a first industrial asset.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

As used herein, the phrase industrial asset describes a piece of equipment and/or a group of equipment assembled together to form a production unit. Examples of such industrial assets may include a transformer, circuit breaker, substation (e.g., comprising one or more transformers and/or one or more circuit breakers), transmission towers, power generator, etc.

A power system comprises thousands if not millions of industrial assets (e.g., including electrical and non-electrical equipment) which require maintenance to operate efficiently and/or to reduce the probability of a failure. Accordingly, maintenance teams frequently consider how to allocate a limited number of resources (e.g., personnel, money, etc.) across the power system (e.g., to achieve a desired impact on the power system). One consideration when determining how to allocate resources and/or manage industrial assets may be the importance (e.g., operational importance, financial importance, etc.) of respective industrial assets to the power system.

Accordingly, systems and/or techniques are described for determining the importance (e.g., criticality) of one or more industrial assets to the power system during a specified period of time. While specific reference is made herein to power systems, the systems and/or techniques disclosed herein may also find applicability in other industrial systems where determining how to allocate a limited number of maintenance resources is desirable and/or where determining optimal levels of maintenance resources and/or funding allocations and/or maintenance schedules is desirable. For example, the systems and/or techniques described herein may find applicability for identifying industrial assets that limit production (e.g., industrial assets that create a bottleneck) in a production facility.

The importance (e.g., criticality) of an industrial asset to the power system is assessed based upon data acquired from one or more data stores and pertaining to the power system. Such data may include operational data (e.g., descriptive of a load placed on the industrial asset, a number of operational transactions performed by the industrial asset per day, an output of the industrial asset, etc.), enterprise informational technology data (e.g., descriptive of a system layout, descriptive of redundancies in the power system, descriptive of properties of the industrial asset (e.g., maximum load, maximum output, etc.), descriptive of available replacements and/or replacement parts for the industrial asset, etc.), and/or data from external sources (e.g., such as indicative of weather conditions, manufacturing lead times, permit requirements, etc.), for example. The data may relate to the industrial asset, one or more sub-elements of the industrial asset, a power system comprising the industrial asset, a portion (e.g., subsystem) of the power system comprising the industrial asset, and/or an environment influencing and influenced by the industrial asset (e.g., including one or more structures of the environment that are influencing and/or influenced by the industrial asset).

In some embodiments, a criticality profile is developed for one or more industrial assets of the power system based upon the acquired data. The criticality profile describes the importance of the industrial asset to the power system. In some embodiments, the importance of the industrial asset in the power system is evaluated based upon an operational impact, a restoration impact, and/or an interdependency measure. The operational impact describes how the power system will be operationally affected if the industrial asset enters a degraded state (e.g., where the industrial asset is operating at a reduced performance level and/or has failed) and/or remains in an unchanged state (e.g., a do-nothing state) and/or enters an improved state (e.g., where the performance level of the industrial asset is increased relative to a current performance level), for example (e.g., various what-if operational impacts are evaluated to identify trade-offs). The restoration impact describes the complexity of restoring the industrial asset if the industrial asset enters the degraded state, the complexity of modifications to achieve the improved state, and/or an anticipated reduction in future restoration complexity if the industrial asset is modified to achieve the improved state, for example. The interdependency measure describes the complexity and/or relationship between the industrial asset and other industrial assets and/or describes the complexity and/or relationship between the industrial asset and/or one or more structures of an environment associated with the industrial asset (e.g., how one or more other industrial assets and/or structures serviced by the industrial asset may be impacted if the industrial asset enters the degraded state or the improved state, or remains in an unchanged state), for example.

In some embodiments, the importance of the industrial asset may change over time, and thus the criticality profile may focus on the importance of the industrial asset at a specified time and/or changes in importance during a specified time period, which may correspond to past, present, and/or future times (e.g., where the time or time period may be specified based upon user input). For example, in some regions the load placed on a set of residential power lines may be substantially greater during the summer season than during the winter season. Accordingly, the importance of a first power line of the set may be greater in the summer season than in the winter season because there are fewer redundancies within the set during the summer season. That is, if the first power line fails during the summer season, the likelihood of an outage occurring may be greater than if the first power line fails during the winter season because other power lines of the set do not have the capacity to support the load of the first power line. As another example, the importance of a substation and/or one or more elements thereof (e.g., a transformer, circuit breaker, etc.) may increase over time as more houses are built and occupied in a residential subdivision served by the substation.

Referring to FIG. 1, an example method 100 for developing a criticality profile describing the importance of a first industrial asset to a power system is provided. In some embodiments, a method similar to the example method 100 may be performed for a plurality of industrial assets of the power system to develop a criticality profile for respective industrial assets of the plurality. In some embodiments, such criticality profiles can be used to order the industrial assets by importance. In some embodiments, maintenance resources can be allocated based upon the criticality profiles (e.g., along with health profiles describing the health state of the various industrial assets).

The example method 100 starts at 102, and at least one criticality metric is determined at 104 using data acquired from one or more data stores. Such data stores can include, among other things, enterprise resource planning (ERP) systems (ERPs), enterprise asset management (EAM) systems, relational databases, columnar databases, unstructured databases, graph databases, geographical information systems (GIS), sources of weather data, sources of demographic data, sources of consumer/user/other behavior data, document store databases, business intelligence (BI) systems, databases associated with a manufacturer(s) of the industrial asset (e.g., manufacturer databases), master data management (MDM) repositories, operational historians, non-operational historians, data stores that store a historical record of previous criticality calculations and/or impacts for the first industrial asset, data stores that store data associated with other industrial assets that are configured similarly to the first industrial asset and/or located in a similar environment, etc.

The data can include operational data, enterprise informational technology data, and/or data from external sources.

For example, the data can include data acquired from one or more suppliers regarding the availability of parts and/or sub-contractors, manufacturing lead team for an industrial assets and/or elements thereof, permit requirements, estimated lead time for obtaining permits, weather forecasts, or other data that may be useful in predicting how the first industrial asset is expected to perform and/or how demand on the first industrial asset is expected to change (e.g., customer demand-response profiles, customer forecast, planned construction which may change loads, etc.), predicting the ability to shift operations from the first industrial asset to one or more other industrial assets, predicting the length of time the first industrial asset will operate in the degraded state(s) (e.g., before repair/replacement) and/or unchanged state and/or improved state(s), predicting restoration time or costs, etc.

In some embodiments, the at least one criticality metric determined at 104 includes at least one of an operation metric, a restoration metric, and/or an interdependency metric.

The operation metric is indicative of the operational impact (e.g., resources, budgets, risks, benefits, timing, etc.) of the first industrial asset on the power system. That is, the operation metric is indicative of how strongly the power system will be impacted if the performance level (e.g., capacity, power quality, etc.) of the first industrial asset is changed (e.g., either reduced or increased due to wear on the first industrial asset, environmental changes to an environment spatial proximate the first industrial asset, a physical modification, an operational modification, etc.).

The restoration metric is indicative of the restoration impact (e.g., resources, budgets, risks, benefits, timing, etc.) of the first industrial asset. That is, the restoration metric is indicative of the complexity of restoring the first industrial asset (e.g., by repairing or replacing the first industrial asset) to a desired operational state from a degraded state and/or the net change in future restoration complexity which results from the first industrial asset remaining in the unchanged state or from modifying (e.g. reconfiguring) the first industrial asset to perform at an improved state from a present operational state.

The interdependency metric is indicative of the operational impacts and/or restoration impacts of the relationship between the first industrial asset and one or more other industrial assets and/or the relationship between the first industrial asset and an environment associated with the first industrial asset (e.g., such as between the first industrial asset and one or more structures served by the first industrial asset). Such impacts may be based upon based on geographical/proximity relationships and/or physical/property relationships (e.g., protection schemes, redundancy configurations, control, proximity, etc.), for example.

In some embodiments, one or more criticality metrics of the at least one criticality metric are determined according to a desired calculation approach, such as a training algorithm (e.g., a Bayesian network algorithm, neural network algorithm, decision tree learning algorithm, classification algorithm, association rule learning algorithm), a connectivity model, and/or a system model, for example. The calculation approach used may differ for respective criticality metrics and/or may be the same for respective criticality metrics. Additionally, in some embodiments, the calculation approach used may differ based upon a type or class of industrial asset to which the industrial asset is a member and/or a domain in which the industrial asset is used (e.g., a first algorithm may be used to calculate an operation metric of a transformer used for power transmission, a second algorithm may be used to calculate an operation metric of a transformer used for power distribution, a third algorithm may be used to calculate an operation metric of a pump used for water distribution, etc.). In some embodiments, such calculation approaches may be further refined based on characteristics of the industrial operation (e.g., geographic region where the industrial asset is located), configuration (e.g., protection scheme in power utility), etc.

Further, in some embodiments, the calculation approach may evolve over time based upon data indicative of actual and/or historical operational impacts, actual and/or historical restoration impacts, actual and/or historical interactions between various assets, and/or based upon actions that are taken in view of the criticality (e.g., a maintenance action is performed on an industrial asset that was determined to be less critical than another industrial asset where no action was taken, a user manually edited the criticality profile of an industrial asset to promote the importance of the industrial asset or demote the importance, etc.). That is, stated differently, the calculation approach may evolve (e.g., may be self-tuned) over time based upon historical data that was the basis for previous impact and/or importance predictions, additional predictions derived therefrom, and/or actual impacts and/or importance determinations (e.g., to adjust the transformation and/or algorithm used for future predictions regarding impacts and/or importance), for example.

At 106 in the example method 100, a confidence profile for one or more of the at least one criticality metrics is generated. The confidence profile is indicative of a confidence in the criticality metric. For example, a confidence profile for the operation metric may describe a confidence in the operational impact represented by the operation metric based upon the data available from which to compute such an operation metric. It may be appreciated that while the example method 100 describes generating a confidence profile, in other embodiments, no confidence profile is generated for at least some (e.g., and possibly all) of the criticality metrics.

In some embodiments, the confidence profile may be described in terms of a numerical value (e.g., where 100 may indicate an absolute confidence in the operation impact and 0 may indicate no confidence in the operation impact). In other embodiments, the confidence profile may describe a cone of uncertainty or other relational uncertainty (e.g., excellent, good, okay, maybe, bad, etc.). By way of example, in some embodiments, there may be a cone of uncertainty around the operational impact. As an example, the operation metric may describe the operational impact of the industrial asset to the power system over the next year. A first confidence may be associated with a first aspect of the operation metric, which describes the operational impact of the industrial asset over the next week and a second confidence may be associated with a second aspect of the operation metric, which describes the operational impact of the first industrial asset in six months. The first confidence may be higher than the second confidence because it is less probable that factors influencing the first aspect will change than factors influencing the second aspect (e.g., it is easier to predict what may occur over the next week than what may occur six months from now). Also, the quality, sensitivity, and/or freshness of data used to determine the criticality metric could narrow, widen, shift, or skew the confidence profile.

At 108 in the example method 100, a criticality profile of the first industrial asset is developed based upon the at least one criticality metric and/or the one or more confidence profiles (e.g., if a confidence profile is generated for one or more criticality metrics). The criticality profile describes the overall importance or criticality of the first industrial asset to the power system in view of the one or more criticality metrics determined at 104 (e.g., in view of the operation impact, restoration impact, operational interdependencies and/or restoration interdependencies between the first industrial asset and other industrial assets of the system).

In some embodiments, the influence of respective criticality metrics to the criticality profile may be based upon confidence profiles associated with respective criticality metrics. By way of example, the operational metric may have a greater influence than the restoration metric if a first confidence profile, associated with the operation metric, indicates higher confidence than a second confidence profile, associated with the restoration metric, and/or vice-versa.

In some embodiments, the criticality profile quantifies the importance of the first industrial asset according to a desired measurement framework (e.g., which may be user specified). By way of example, the criticality profile may quantify the importance of the first industrial asset in terms of monetary currency (e.g., the company stands to make or lose "x" dollars if the first industrial asset is operating as at present, stands to lose "y" dollars if the first industrial asset enters a degraded state, and/or stands to gain "z" additional dollars if the first industrial asset enters an improved state). As another example, the criticality profile may quantify the importance of the first industrial asset in terms of customer satisfaction (e.g., customer satisfaction is likely to drop by two points on a Likert scale rating if the first industrial asset enters a degraded state). Other example measurement frameworks in which the importance of the first industrial asset may be quantified include safety-related frameworks, environment-related frameworks, asset reliability frameworks (e.g., uptime percentage, mean time between failures, system average interruption duration index, remaining useful life, effective age, system average interruption frequency index, etc.) and/or business-objective specific frameworks (e.g., how a failure of the first industrial asset may affect the company's reputation for quality, innovativeness, reliability, etc.).

In some embodiments, the criticality profile quantifies the importance of the first industrial asset relative to the importance of other industrial assets of the power system and/or of a class of industrial assets to which the first industrial asset is a member. By way of example, an ordered rating scale (e.g., 1-5; A-E; low, medium, high; etc.) may be developed to describe the importance of industrial assets to a power system and the criticality profile may indicate where, on the ordered rating scale, the importance of the first industrial asset lies. As other example, the criticality profile may quantify the importance of the first industrial asset on a percentage scale and/or on a ratio scale, for example.

In some embodiments, quantifications provided in the criticality profile may be intermittently updated based upon changes to the measurement framework and/or based upon other specified events (e.g., input from the users requesting that a first quantification be converted to a second quantification). For example, a first transformation may be used to convert a customer satisfaction quantification into a revenue quantification (e.g., customer dissatisfaction may be re-quantified in terms of dollars lost). As another example, a second transformation may be used to convert an increase in uptime percentage quantification into a revenue quantification (e.g., a 1% increase in uptime by the first industrial asset may be re-quantified in terms of additional revenue generated due to the additional uptime). As yet another example, a third transformation may be used to convert a change in a regulatory index quantification into a profitability quantification (e.g., profitability may decrease by 1% due to an associated fine). As still another example a fourth transformation may be applied to convert one or more quantifications into an absolute or relative numeric scale for measuring criticality across a plurality of industrial assets (e.g., converting the expected change in profitability into a percentage scale criticality metric defined based upon the criticality of one or more baseline industrial assets).

The example method 100 ends at 110.

Figure 2:
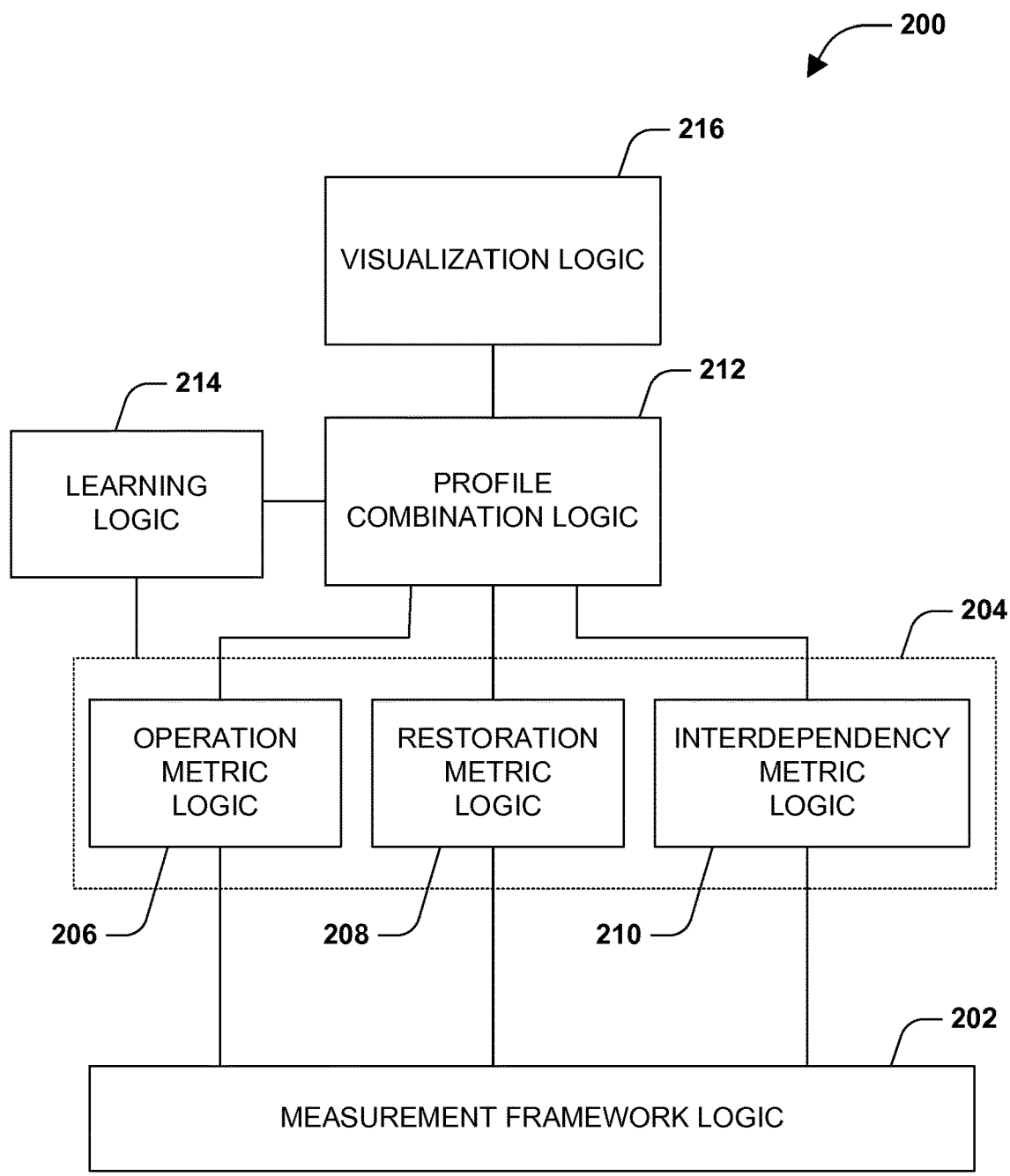
FIG. 2 illustrates an example logical diagram for developing a first criticality profile for a first industrial asset.

FIG. 2 illustrates an example logical diagram 200 describing how one or more criticality metrics can be determined and used to develop a criticality profile of a first industrial asset. By way of example, a measurement framework logic 202 may be configured to provide a measurement framework describing how one or more criticality metrics, such as an operation metric, a restoration metric, and/or an interdependency metric and/or describing how the aspects of the criticality profile (e.g., such as an overall importance of the first industrial asset to the power system) are to be quantified. By way of example, the measurement framework may provide that the criticality profile is to describe the number of dollars expected to be gained or lost if the first industrial asset is operating at an unchanged or degraded state, and/or has failed, and/or is operating at an improved state (e.g., relative to a current operating state). As another example, an operation metric, restoration metric, etc. may be quantified in monetary terms, terms of customer satisfaction or other desired quantification scheme (e.g., in terms of reliability).

The example logical diagram also comprises criticality metric logic 204 configured to determine and/or compute one or more criticality metrics used to develop the criticality profile. By way of example, in the illustrated embodiment, the logical diagram includes operating metric logic 206 configured to determine/compute an operation metric, restoration metric logic 208 configured to determine/compute a restoration metric, and interdependency metric logic 210 configured to determine/compute an interdependency metric.

The operation metric determined and/or computed by the operation metric logic 206 is indicative of the operational impact of the first industrial asset on the power system. That is, the operation metric is indicative of how strongly the power system will be impacted if the first industrial asset enters a degraded state (e.g., a state where the first industrial asset performs at a level less than desired and/or a failed state) or an unchanged state (e.g., where the first industrial asset performs at current level) or an improved state (e.g., where the performance of the first industrial asset is improved relative to a current performance) or other states. By way of example, the operation impact may take into consideration the number of customers impacted if the first industrial asset enters the degraded state, the gap between customer demand profiles and production capacity of the first industrial asset if it remains unchanged in its current state, an expected decrease in production capacity if the first industrial asset enters the degraded state, and/or an expected increase in production capacity and/or customers served if the first industrial asset enters an improved state, for example.

In some embodiments, such an operation metric may take into consideration how the first industrial asset will be impacted over a degradation continuum or improvement continuum and/or over a sequence of discrete degradation levels or improvement levels relative to the current operating state (e.g., what will the impact be if the performance of the first industrial asset drops to a first level, what will the impact be if the performance drops to a second level, etc.). In other embodiments, the operation metric may merely consider two or three states, such as a current operating state and a degraded state, a current operating state and an improved state, or a current operating state and a degraded state and an improved state.

In some embodiments, the operation metric is statically assigned for the first industrial asset by the operation metric logic 206. By way of example, user input may be received by the operation metric logic 206 indicative of a static operational impact ranking that the user has assigned to the first industrial asset based upon nameplate data describing the capacity of the first industrial asset. As an example, a first transformer may be configured to support a load of 50 kVA and a second transformer may be configured to support a load of 500 kVA. Accordingly, the user may assign the first transformer a static impact ranking that is less than the static impact ranking of the second transformer because it is believed, based upon the maximum load size, that the first transformer is supporting fewer customers than the second transformer. In another embodiment, such static impact rankings may be programmatically assigned by the operation metric logic 206 based upon nameplate data and/or other data describing the performance of the first industrial asset and/or describing expected operations parameters (e.g., range of workload, average output, etc.) for the first industrial asset, for example.

In some embodiments, the operation metric is dynamically determined by the operation metric logic 206. For example, a user may specify a period of time of interest and the operation metric logic 206 may compute the operation metric using data indicative of expected operational conditions (e.g., expected loads or load variances, expected outputs or output variances, etc.) of the first industrial asset during the specified period of time, indicative of expected weather conditions impacting the first industrial asset during the specified period of time, indicative of expected community events impacting the first industrial asset during the specified period of time (e.g., based upon schedules of events retrieved from one or more data sources), indicative of expected system configuration or design changes during the specified period of time, etc.

As an example, the operational metric may consider how a community event that is scheduled during a portion of the specified time period may influence the importance of the first industrial asset to the power system. By way of example, a professional baseball game during a portion of the specified time period may be expected to substantially increase the amount of power drawn by a community that is serviced by the first industrial asset and may be expected to reduce, to a different extent, the amount of power drawn by game attendees' home communities which are serviced by other industrial assets. Accordingly, during the professional baseball game, the load on the first industrial asset may be increased to a level that cannot be supported by other industrial assets (e.g., because other industrial assets will also carry increased load for the event and thus will lack the capacity to support the additional load of the first industrial asset). Thus, a failure of the first industrial asset during the professional baseball game may result in an outage. As such, during the professional baseball game, the operational impact, and thus the operational metric, may be higher because a failure or reduction in capacity by the first industrial asset during the baseball game may trigger a power outage, because the failure may also result in damage to the public reputation of the power utility and/or baseball game facility, and/or because the failure may trigger a clause in a contractual agreement between the power provider and the baseball game facility which would penalize the power provider for such incidents. When the professional baseball game is over, the load may decrease to a level that can be supported by other industrial assets if an outage occurs at the first industrial asset, and thus the operational impact may decrease after the game. Further, the operational impact, and thus the operational metric, may be less if no professional baseball game is occurring at the stadium during the specified period of time.

In some embodiments, the operation metric determined/computed by the operation metric logic 206 is a single value (e.g., such as a numerical score between 0-100). In other embodiments, the operation metric may be a composite value which reflects one or more measurements of operational impact (e.g., changes in workload or production from the first industrial asset, lost or gained revenues associated with these changes, financial impact of fines or rewards associated with changes in workload, production, safety record, environmental regulatory compliance, etc.). In still other embodiments, the operation metric is a profile of single values or composite values.

In some embodiments, different types of scenarios may be evaluated and a value may be computed for respective types of scenarios to be included within the profile of the operational metric. By way of example, suppose the first industrial asset is a power distribution pole with two connected cable segments. A first scenario may consider the operational impact if an auto accident disturbs the distribution pole and causes a first connected cable segment of the two connected cable segments to be knocked loose and shorted out, and a second scenario may consider the operational impact if the auto accident causes both of the two connected cable segments to be shorted. The first scenario may have less of an operation impact than the second scenario, because the first scenario may result in merely a loss of power to customers serviced by the first connected cable segment, while the second scenario may result in a loss of power to customers serviced by both of the two connected cable segments (e.g., more customers would be affected by the second scenario). Accordingly, a first value may be computed for the first scenario and a second value may be computed for the second scenario, where the second value may be higher than the first value because more customers are affected.

In some embodiments, respective values computed for the different scenarios are transformed (e.g., weighted, computed from a statistical model, etc.) based upon the likelihood of the scenario occurring. By way of example, based upon historical information regarding auto accidents with a class of distribution poles to which the distribution pole is a member, it may be more probable that an auto accident causes merely one segment of the two connected cable segments to short than both segments of the two connected cable segments. Accordingly, the first value may be weighted more than the second value (e.g., the first scenario and first value may influence the operational metric more than the second scenario and second value).

The restoration metric determined and/or computed by the restoration metric logic 208 is indicative of the restoration impact of the first industrial asset. That is, the restoration metric is indicative of the complexity of restoring the first industrial asset (e.g., by repairing or replacing the first industrial asset) to a desirable operational state (e.g., a state where the first industrial asset is operating as desired). For example, the restoration metric may be indicative of the complexity of restoring the first industrial asset to an operating state from its present operating state and/or from at least one degraded state, and/or to an improved state from a present operating state. Such a restoration impact may take into consideration the costs, time, parts, equipment, labor, risks, and/or process required to restore the first industrial asset to an operational state(s), for example. The restoration metric may also consider the restoration impact of an improvement in the first industrial asset (e.g., the extent to which the impact of future restorations might be reduced as a result of the improvement). The restoration metric may also consider a relationship between various events in a process of restoring the first industrial asset (e.g., such as how a lead time for a part may impact scheduling maintenance crews, how site prep time may impact testing, etc.).

In some embodiments, the restoration metric may be indicative of varying degrees of complexity based upon the desired performance level of the industrial asset and/or the degraded state. For example, the restoration impact may describe the complexity of restoring the first industrial asset to a first performance level from a first degraded state and restoring the first industrial asset to a second performance level from a second degraded state. As another example, the restoration impact may describe the complexity of restoring the first industrial asset to a first operational state from its present operating state and restoring the first industrial asset to a second operational state from the degraded state.

In some embodiments, the restoration metric is statically assigned for the first industrial asset by the restoration metric logic 208. As an example, user input may be received by the restoration metric logic 208 indicative of a numerical value describing the difficulty in the restoration. Such a difficulty may be based upon, among other things, the amount of time it typically takes to restore industrial assets of a class of industrial assets to which the first industrial asset is a member and/or the typical cost to restore industrial assets of the class. In other embodiments, such a numerical value is programmatically assigned by the restoration metric logic 208 based upon similar criteria or other criteria available (e.g., average, range, or variation profile for the number of man-hours to restore industrial assets of the class, the industrial domain in which the industrial asset is deployed, location or accessibility of the industrial asset, etc.).

In some embodiments, the restoration metric is dynamically determined by the restoration metric logic 208. For example, a user may specify a period of time of interest and the restoration metric logic 208 may compute a restoration impact that is expected during the specified period of time. Using the specified period of time, the restoration metric logic 208 predict the availability of resources to repair and/or replace the first industrial asset. By way of example, the restoration metric logic 208 may take into consideration the estimated availability of replacement equipment (e.g., to replace the first industrial asset) and/or parts (e.g., to repair the first industrial asset). As another example, the restoration metric logic 208 may take into consideration the availability of personnel skilled in replacing and/or repairing the equipment. By of example, during the summer season, the number of personnel available to repair the first industrial asset may decrease due to vacations, and/or the cost may increase due to the decreased availability of sub-contractors who are tied up on other projects.

The restoration metric logic 208 may also take into consideration the estimated amount of time to repair and/or replace the first industrial asset during the specified period of time. By way of example, the restoration metric logic 208 may take into consideration the estimated lead time for manufacturing and/or delivery of replacement equipment and/or parts during the specified period of time. As another example, the restoration metric logic 208 may take into consideration the amount of time it typically takes for personnel to repair and/or replace industrial assets under conditions similar to those expected during the specified period of time (e.g., where it may take personnel longer in the summer because of more frequent water breaks and/or it may take personnel longer if the first industrial asset is elevated off the ground). As still another example, the restoration metric logic 208 may take into consideration the type of permits required to repair and/or replace the first industrial asset and/or a lead time for collecting those permits during the specified period of time (e.g., where the lead time may change based upon the season and number of permits filed).

The restoration metric logic 208 may also take into consideration the estimated cost to repair and/or replace the first industrial asset and/or whether such cost is worth it to an entity responsible for covering such cost (e.g., whether the first industrial asset and/or part still has depreciable value to the entity, etc.). By way of example, the restoration metric logic 208 may take into consideration the estimated cost associated with purchasing and/or installing the spare equipment and/or parts. As another example, the restoration metric logic 208 may take into consideration the estimated cost of obtaining permits and/or permission to repair and/or replace the first industrial asset during the specified period of time.

The restoration metric logic 208 may also take into consideration the consequential damages and associated costs related to degree and/or timing of a failure and/or drop in performance level by the first industrial asset. For example, the longer a transformer is leaking and not repaired, the greater the leakage quantity, which may result in a significant cleanup effort and/or fines, in addition to the costs of repairs. As another example, the restoration impact of repairing a transformer with failing insulation may be less if maintenance is performed prior to failure of the transformer than the restoration impact if the transformer continues to operate with degrading insulation and results in an explosion or fire (e.g., possibly resulting in significant damage to the environment through environmental contamination to ground, air, vegetation, animals, etc., damage to facilities (e.g., nearby buildings, parking decks, etc.), damage to personnel, etc., and thus increasing the restoration impact).

The interdependency metric logic 210 is configured to determine and/or compute an interdependency metric that describes the relationship between the first industrial asset and one or more other industrial assets and/or an environment associated with the first industrial asset (e.g., such as one or more structures supplied power by the first industrial asset and/or one or more environmental elements served by the first industrial asset). Such relationships may be operational relationships and/or restoration relationships, and the interdependency metric may include an operational aspect describing the operational relationships and/or restoration aspect describing the restoration relationships.

In some embodiments, the operational aspect of the interdependency metric may reflect the availability of other online or offline industrial assets that can perform the functions of the first industrial asset and/or have the capability to do so. As an example the interdependency metric logic 210 may determine the interdependency metric, or an operational aspect thereof, based upon expected redundancies for the first industrial asset during a specified period of time of interest for the criticality profile. By way of example, the load on a power system and/or industrial asset thereof may change based upon time of day, weather conditions, season, community events in a community where power is fed from the industrial asset, etc., which may influence the available redundancies for the first industrial asset. For example, if the specified period of time is in the middle of the night (e.g., when power usage is reduced), the impact on customers if the first industrial asset fails may be negligible (e.g., few or no customers may lose power) because the power not supplied by the first industrial asset may be supplied by a second industrial asset with excess capacity. If, on other hand, the specified period of time is in the evening on what is expected to be a hot night, the impact felt if the first industrial asset fails may be substantial (e.g., 1000 customers may lose power) because other industrial assets may not have sufficient capacity to support the load of the first industrial asset.

As another example, the operational aspect of the interdependency metric may reflect expected conditions of the power system during a specified period of time of interest for the criticality profile. For example, a portion of the specified period of time may coincide with a scheduled or predicted outage of a second industrial asset (e.g., due to maintenance, a storm, a predictable incident, etc.) which relies on the first industrial asset to provide redundant services. Accordingly, the impact to the system and/or on customers of a failure of the first industrial asset during the outage may be substantially greater than the impact of a failure when the second industrial asset is not experiencing an outage. Thus, a value of the interdependency metric and/or an operational aspect thereof may be greater during the portion of time when the second industrial asset is expected to experience an outage than during other times when the second industrial asset is expected to be operational.

As another example, the restoration aspect of the interdependency metric may reflect the availability of other industrial assets to perform functions of the first industrial asset. By way of example, a first weather station may collect temperature readings and humidity readings while a second weather station, located in close spatial proximity to the first weather station, collects merely temperature readings. If a control system, located spatially proximate the first weather station, uses the humidity readings to set operating parameters of a substation, the failure of the first weather station may result in the control system not receiving humidity readings because the second weather station does not collect humidity readings. However, if the control system merely uses temperature readings to set operating parameters, the failure of the first weather station may be relatively insignificant to the power system because the control system can receive temperature readings from the second weather station (e.g., albeit perhaps with a different level of data quality (e.g. precision, accuracy, sensitivity, or confidence) than those provided by the first weather station). Accordingly, a different value may be assigned to the first weather station if the control system utilizes the humidity readings than if the control system does not utilize the humidity readings.

In some embodiments, the interdependency metric logic 210 may consider operational and/or restoration impacts of a protection relationship between a first industrial asset and a second industrial asset. For example, a well-functioning protective device (e.g., IED or lightning protection) associated with a transformer may reduce the risk or extent of damage to the transformer and thereby reduce the potential operational impact and/or restoration impact, whereas an otherwise similar transformer without a similar protective device would be expected to have increased damage and therefore a higher operational impact and/or restoration impact.

In some embodiments, the interdependency metric logic 210 may consider that the operational importance of the first industrial asset may depend upon the operational importance of a second industrial asset. By way of example, the operational importance of a protective device may depend in part on the operational importance of the device(s) it is protecting. For example, the importance of a protective IED may rise and fall in partial relation to increases or decreases in the criticality of the transformer it is protecting (e.g., as the criticality of a power transformer increases, the importance of having a well-performing protective device may increase as well). As another example, the operational importance of the protective device may vary with, or inversely with, the device(s) it is protecting. For example, the importance of the protective IED may increase as the health of the transformer it is protecting degrades and the ability of the transformer to withstand incidents, which the IED is designed to protect the transformer against, decreases. As another example, the importance of the protective IED may decline with decreases in the remaining useful life and/or residual depreciable value of the transformer to the owning entity.

As another example, the restoration aspect of the interdependency metric may reflect how the impact of repairing the first industrial asset may (positively or negatively) impact the ability to repair one or more other industrial assets, or vice versa. By way of example, in a first scenario there may be a limited number of parts available to repair a class of industrial assets to which the first industrial asset is a member. Using one or more of the spare parts to repair the first industrial asset may result in an even smaller number of parts being available to repair other industrial assets of the class (e.g., which may be operationally more important than the first industrial asset even though, at the present time, such other industrial assets are not in need of the spare part). As another example, in a second scenario, if a first industrial asset and a second industrial asset are both of some importance, and if both would necessarily be offline during repairs on either industrial asset, then in some embodiments the impact of performing maintenance on both industrial assets may be different from the sum of the restoration impact of performing maintenance on respective industrial assets during separate time periods. For example, restoration of either a transformer or an IED protecting the transformer may require disconnecting power to the segment of the power grid which includes both industrial assets, resulting in potentially reduced restoration impact if maintenance is performed concurrently to some degree on both industrial assets.

In some embodiments, the interdependency metric logic 210 may consider operational and/or restoration impacts of control devices or mechanisms. For example, the unavailability or improper functioning of a subsystem control device (e.g. a switch) may increase the risk or complexity of safely removing from service one or more industrial assets (e.g. a transformer) which are intended to be controlled by the device, thereby increasing the restoration impact of respective associated industrial assets. However, in such an example, the impact of installing or repairing the control device along with one or more of the associated industrial assets, or of repairing more than one of the industrial assets during the same maintenance time period, may be less than the combination of the separate restoration impacts. Further, in such an example, incurring the impact of repairing the switch in one time period may decrease the future restoration impacts of the associated industrial assets in future time periods, for example.

In some embodiments, the interdependency metric logic 210 may consider direct or indirect dependencies derived from analysis of an environment associated with the first industrial asset (e.g., such as one or more structures which are fed power by the first industrial asset). For example, if a data center or industrial facility draws power from more than one independent feeder, the operational impact and/or restoration impact of the first feeder and industrial assets associated with the first feeder may be adjusted to consider the operational impact and/or restoration impact of a second feeder and industrial assets associated with the second feeder. As another example, if a power distribution feeder line underlies an important roadway or controlled-access facility, the time, effort, and cost contributions to repair that segment of the feeder will be higher than for an otherwise similar feeder segment which is more easily accessible through soft soil.

In some embodiments, criticality metric logic 204 and/or aspects thereof, such as the operation metric logic 206, restoration metric logic 208, and/or interdependency metric logic 210, may be configured to compute a confidence profile indicative of a confidence in one or more of the determined metrics (e.g., as further described with respect to the example method 100 of FIG. 1). For example, the operation metric logic 206 may be configured to compute a confidence profile indicative of a confidence in the operation metric based upon the availability of data, types of data available, quality of such data, etc.

Referring to the logical diagram 200, in some embodiments, one or more of the criticality metrics, such as the operation metric, the restoration metric, and/or the interdependency metric are combined, synthesized, or otherwise manipulated by profile combination logic 212 to generate a criticality profile indicative of the importance of the first industrial asset. In some embodiments, the profile combination logic 212 used machine learning algorithms and/or domain-specific connectivity models and/or algorithms to determine how the criticality metrics are combined to generate the criticality profile. Further, as described with respect to FIG. 1, in some embodiments, the profile combination logic 212 is configured to receive user input specifying how the importance of the first industrial asset to the system is to be quantified, how to adjust the quantification to allow a comparison between the first industrial asset and other industrial assets, etc.

In some embodiments, at least some of the algorithms used by the profile combination logic 212 and/or the criticality metric logic 204, include the operation metric logic 206, restoration metric logic 208, and interdependency metric logic 210 are learning algorithms configured to be trained by learning logic 214. That is, stated differently, the learning logic 214 may receive actual and/or historical operational impacts, actual and/or historical restoration impacts, actual and/or historical interdependencies, actual and/or historical criticalities, and/or actual and/or historical decisions taken based upon the criticality and compare such information to the calculated results from one or more of the foregoing logics. Based upon such a comparison, the learning logic 214 can adjust a parameter of one or more algorithms and/or select a different type of calculation approach for future calculations by the logic. In this way, the algorithms can be refined and/or adapted over time, for example as maintenance and/or operation strategies change, as changes occur to the composition of the power system, and/or as asset characteristics change (e.g., such as a shift to amorphous core transformers and/or hybrid transformers occur).

The logic diagram 200 also includes visualization logic 216 configured to develop one or more visualizations of the criticality profile developed by the profile combination logic 212 and/or to develop one or more visualizations which combine the criticality profiles of various industrial assets. Such a visualization may be a static visualization (e.g., that does not change over the time of usage by the user, except as the underlying data sourced to the visualization may change) or may be a dynamic visualization (e.g., which may include animations or other movement to highlight particular aspects of the visualization and/or to add interest, for example).

In some embodiments, the visualization logic 216 is based upon a geographic information system (GIS) map or other asset connectivity diagram. For example, respective industrial assets may be depicted within a surrounding environment (e.g., stadium, factory, hospital, etc.), and a relationship between one or more respective industrial assets and/or one or more structures within the environment may be depicted.

In some embodiments of the visualization logic 216, the user may select an industrial asset and the impact of the industrial asset on various aspects of the environment may be depicted. By way of example, the user may select a transformer and aspects of the environment may be colored to show the impact the transformer would have on such aspects. For example, a stadium which receives power through the transformer may be colored red to show that the stadium would be severely impacted if the transformer enters a degraded state and a mall may be colored yellow to show moderate impact (e.g., because the mall could still operate for at least some time without experiencing an outage if the transformer entered a degraded state).

In some embodiments of the visualization logic 216, the user may select a structure within an environment, and the criticalities of industrial assets relating to that structure may be depicted. By way of example, when a user selects a stadium which receives service from multiple feeders (e.g., power feeders, water feeders, etc.), the industrial assets and connections in those feeders may be visually highlighted, colored, or animated to illustrate the criticality of respective industrial assets to the stadium.

In some embodiments of the visualization logic 216, users may further filter industrial assets and/or structures within an environment (e.g. stadium, mall, or residential home or subdivision) based upon type, criteria, condition, importance, etc. to merely depict a subset of industrial assets and/or structures within the visualization. By way of example, the user may apply a red filter to a first type of structure (e.g., stadiums), and the interdependencies and/or criticalities of structures corresponding to the first type of structure may be visualized using similar elastic connections.

In some embodiments of the visualization logic 216, the interdependencies among various industrial assets may be visualized using elastic connections (e.g., where a user selects one or more industrial assets and moves them, triggering other industrial assets that are dependent upon the industrial assets to shudder or vibrate) and/or redundant assets may be distinguished to depict redundancy, protection, and/or other interdependencies in the system.

Figure 3:
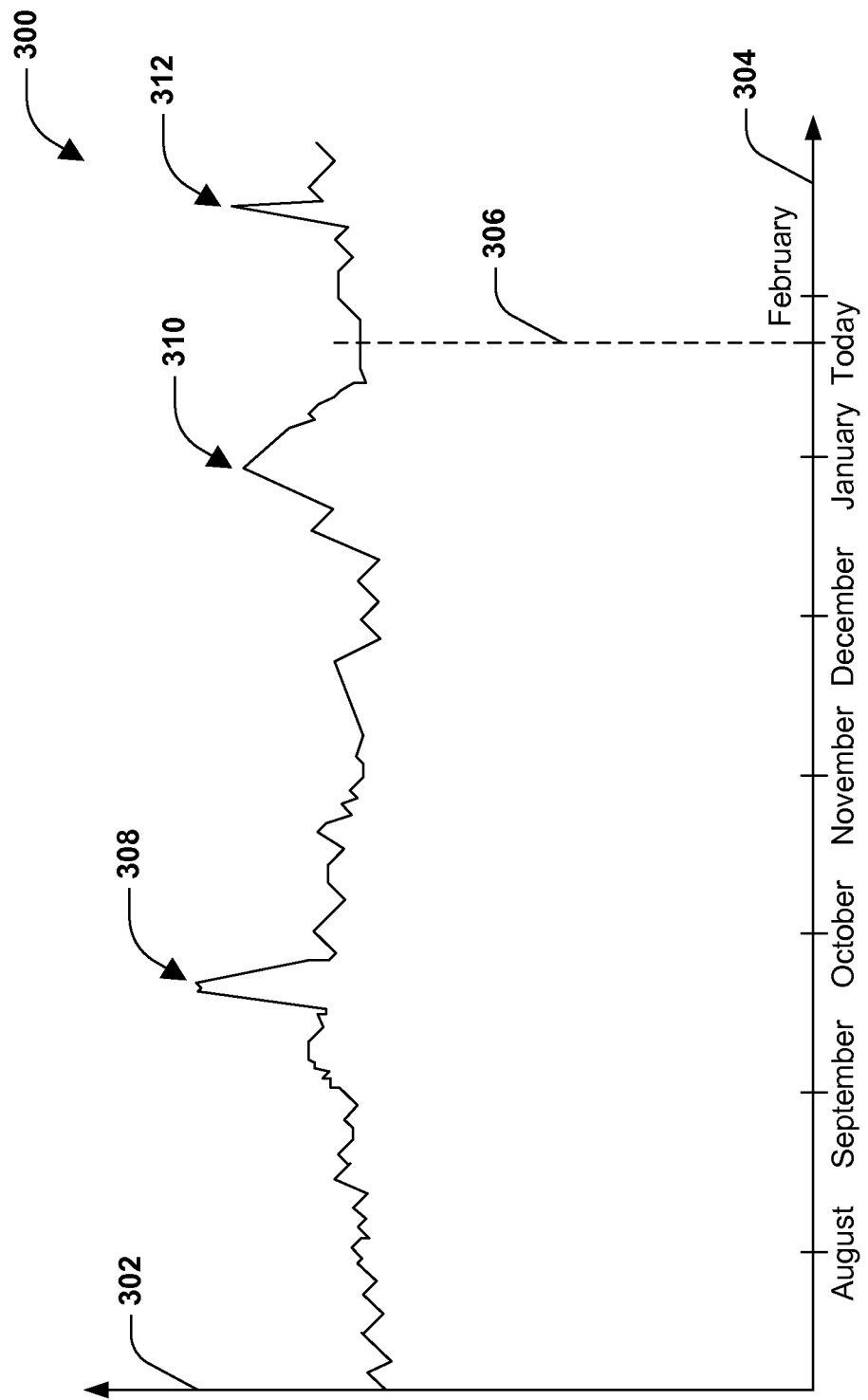
FIG. 3 illustrates an example visualization of a first criticality profile for a first industrial asset.

FIG. 3 illustrates an example visualization 300 of a criticality profile of the first industrial asset, such as may be generated using the example method 100 of FIG. 1. The visualization 300 is a line graph, where the y-axis 302 of the line graph represents the importance of the first industrial asset to the system and the x-axis 304 represents a specified time window. In the illustrated embodiment, the present day is shown by a dashed line 306 extending in the y-direction. Accordingly, the specified time window includes both past importance (e.g., which may be based on actual data) and future importance (e.g., which may be based on predictions made regarding the performance of the first industrial asset and/or based on predictions of the data and factors which impact the various aspects of criticality).

As illustrated in FIG. 3, the importance of the first industrial asset may change over time, such as based upon the day, season, etc. For example, the importance of a transformer may increase during the summer season when demand for electricity is typically greater and thus there is less excess capacity. As another example, long-term plans or trends may cause the importance of an industrial asset to change over time. For example, as more houses are built and occupied in a residential subdivision served by a substation or community water distribution asset, the importance of these industrial assets and/or components thereof may increase (e.g., in a series of jumps) over a period of several years.

As illustrated in FIG. 3, the importance of the first industrial asset may also be a function of community events occurring in a region serviced by the first industrial asset and/or outages which increase the load on the first industrial asset and/or reduce redundancies for the first industrial asset. By way of example, in September a professional sporting event may have taken place which elevated the importance of the industrial asset as represented at 308. As another example, in December and January, an outage may have occurred to a nearby industrial asset which increased the importance of the first industrial asset as represented at 310 (e.g., because the outage meant there was less available capacity among redundant assets to support a load of the first industrial asset if the first industrial asset entered a degraded state). Similarly, if a first industrial asset enters an improved state and handles a greater portion of the load in the power system, then the operational importance and associated criticality of a second industrial asset in such a redundant configuration may decrease.

As illustrated in FIG. 3, the importance of the first industrial asset into the future may be estimated based upon projected loading and/or a schedule of community events. For example, the spike at 312 may be indicative of a professional basketball game that is scheduled to take place at an arena which draws power from the first industrial asset.

Figure 4:
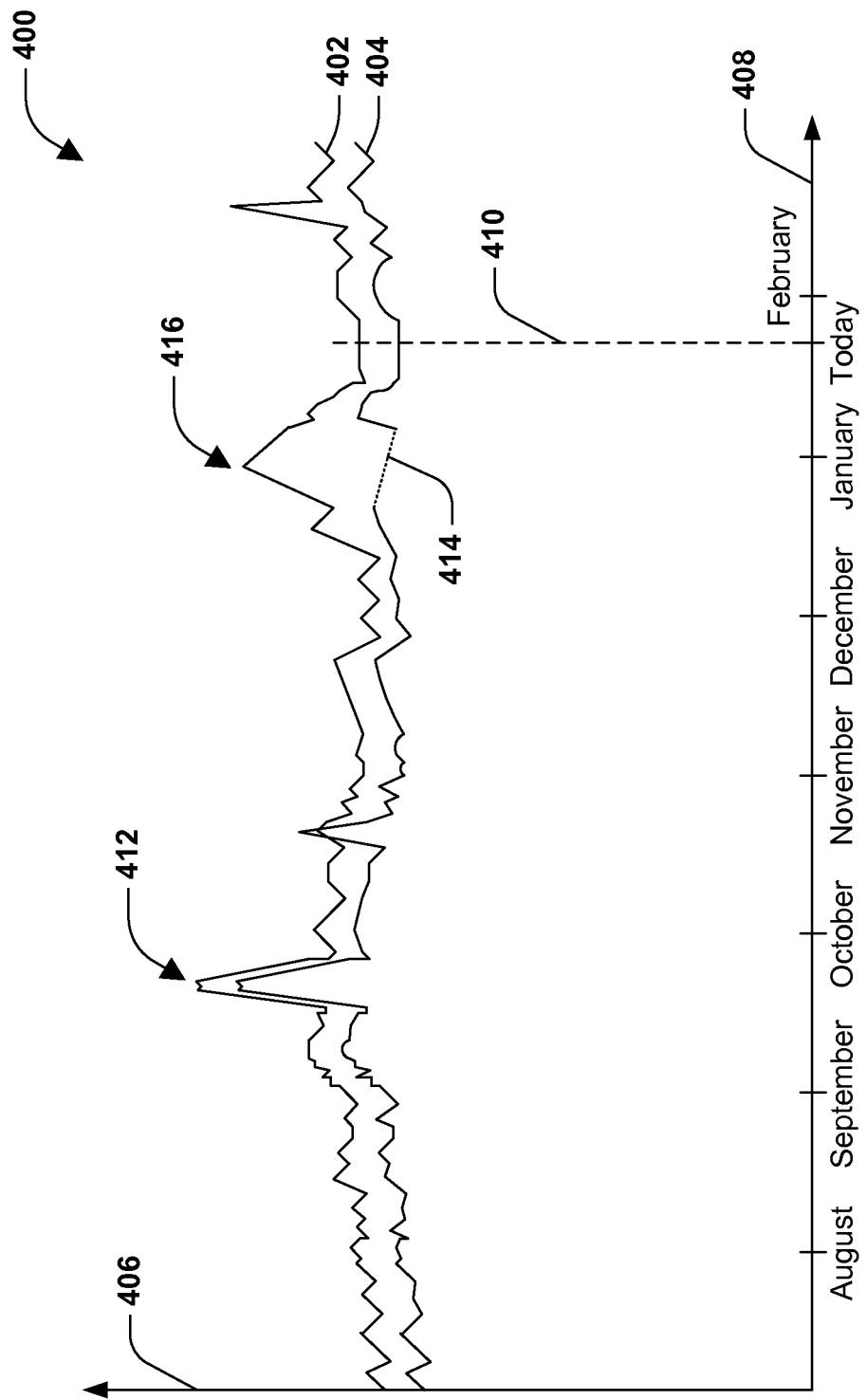
FIG. 4 illustrates an example visualization of a first criticality profile for a first industrial asset and a second criticality profile for a second industrial asset.

FIG. 4 illustrates an example visualization 400 of a criticality profile of two related industrial assets (e.g., where a first industrial asset of the two industrial assets may be configured to support a load of a second industrial asset of the two industrial assets and/or the second industrial asset may be configured to support a load of the first industrial asset—such that the two industrial assets are redundant assets). The visualization 400 is a line graph, where a first line 402 represents the importance of the first industrial asset and a second line 404 represents the importance of the second industrial asset. The y-axis 406 of the line graph represents the importance of the industrial assets to the system and the x-axis 408 represents a specified time window. In the illustrated embodiment, the present day is shown by a dashed line 410 extending in the y-direction. Accordingly, the specified time window may include both past importance (e.g., which may be based on actual data) and/or future importance (e.g., which may be based on predictions made regarding the performance and environment of the first industrial asset and second industrial asset).

The importance of the respective industrial assets may change over time (e.g., as further described with respect to the logic diagram 200 of FIG. 2), such as based upon the day, season, etc. Further, the importance of one or both of the two industrial assets may be a function of outages, community events, etc. By way of example, the first industrial asset and the second industrial asset may supply power to a sporting venue. Accordingly, when a major event is taking place at the sporting venue (e.g., which draws extra power), the importance of both industrial assets may be elevated, as illustrated at 412, because an outage may occur at the venue if one or both of the industrial assets enter a degraded state during this time or if their current operating state is inadequate for handling this extra power demand.

The importance of an industrial asset may also be affected based upon how other industrial assets are performing. For example, when an outage occurs to the second industrial asset, as represented by the dotted line 414, the importance of the first industrial asset may increase as illustrated at 416 (e.g., because during the outage there may be fewer redundancies in the power system to roll-over to if the first industrial asset fails). As another example, as the condition of a transformer degrades over time and the ability of the transformer to withstand an inrush current is weakened, the operational importance of an industrial asset protecting the transformer (e.g., an IED) may increase over time.

Figure 5:
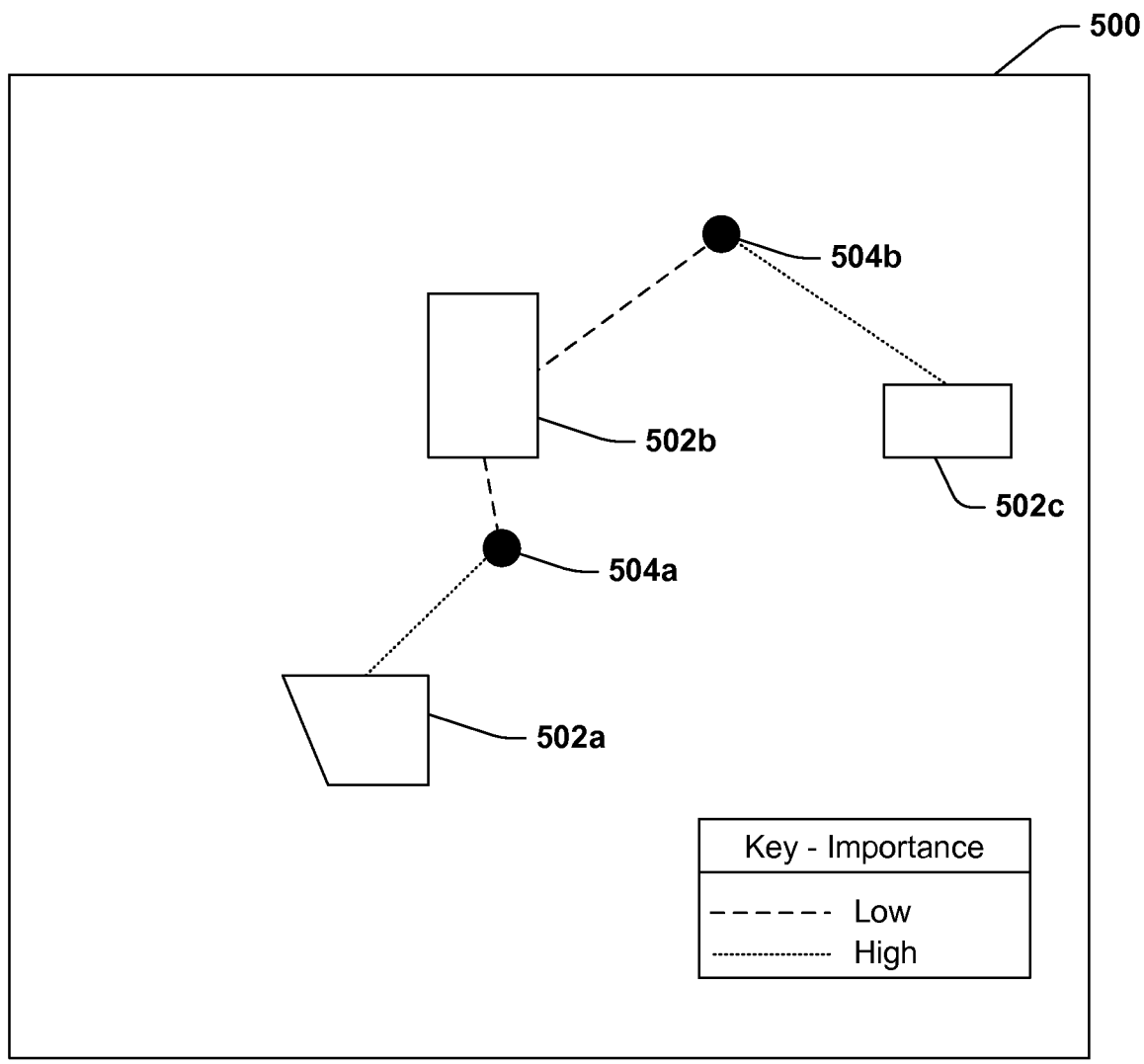
FIG. 5 illustrates an example visualization of a first criticality profile for a first industrial asset and a second criticality profile for a second industrial asset.

FIG. 5 illustrates an example visualization 500 wherein the impact of an industrial asset on a surrounding environment is shown. More particularly, a diagram is illustrated which depicts various structures 502a-c within a community, such as a stadium, hospital, etc., and various industrial assets 504a-b. For purposes of this example, the industrial assets 504a-b are two substations. In other embodiments, the visualization 500 may describe the importance of pole-mounted transformers, distribution lines, breakers, and/or other industrial assets of the power system to such structures 502a-c.

Lines are drawn between the structures 502a-c and the substations 504a-b to describe the relationship between the structures 502a-c and the substations 504a-b (e.g., describing which substations 504a-b are configured to supply power to which structures 502a-c). For example, a first substation 504a is configured to supply power to a grocery store 502a and a stadium 502b, while a second substation 504b is configured to supply power to the stadium 502b and to a hospital 502c.

Further, the importance of respective substations 504a-b to respective structures 504a-c may also be illustrated on the diagram. By way of example, dotted lines may represent a high level of importance (e.g., an outage may occur if the substation enters a degraded state) and the dashed lines may represent a lower level of importance (e.g., there is sufficient redundancy to allow the structure to continue to operate even if the substation enters a degraded state). Accordingly, the stadium 502b has a low level of reliance on the first substation 504a and the second substation 504b (e.g., because the stadium 502b has other avenues for receiving adequate power, such as from a generator or other substations). However, the grocery store 502a relies heavily on the first substation 504a (e.g., and may experience an outage if the first substation 504a enters a degraded state). In other embodiments, other schemes may be devised to illustrate a level of dependency/reliance that a structure has on a substation or other industrial asset. For example, the level of dependency may be illustrated based upon patterning, line weighting, and coloring (e.g., red, yellow, or green).

It some embodiments, the visualization 500 may be interactive. For example, the user may select the first substation 504*a* to view the criticality profile of the first substation 504*a* and/or to view a second visualization such as the visualization 300 of FIG. 3. As another example, the user may select the first substation 504*a* to view dependencies between one or more elements of the first substation 504*a* (e.g., transformers, insulators, protective devices, circuit breakers, etc.) and structures served by the first substation 504*a*. For example, the user may select the first substation 504*a* and view the how the importance of a first transformer of the first substation 504*a* impacts the importance of the first substation and/or view dependencies between the first transformer and various structures of the environment.

In some embodiments, the visualization 500 may be animated. For example, the visualization 500 may provide a time lapse depicting how the importance of one or more substations 504*a-b* changes over time. By way of example, during scheduled community events at the stadium 502*b*, the importance of the first substation 504*a* and/or the second substation 504*b* may be elevated. In some embodiments, the user may select the stadium 502*b*, and the visualization 500 may depict how the importance of associated industrial assets (e.g., such as substations 504*a-b*) change over time. As another example, there may be a scheduled outage for a first transformer feeding power to the grocery store 502*a* and the visualization 500 may illustrate how the importance of a second transformer feeding power to the grocery store 502*a* changes over time (e.g., where the importance of the second transformer may increase during the scheduled outage of the first transformer and may decrease after the first transformer resumes operation).

Figure 6:
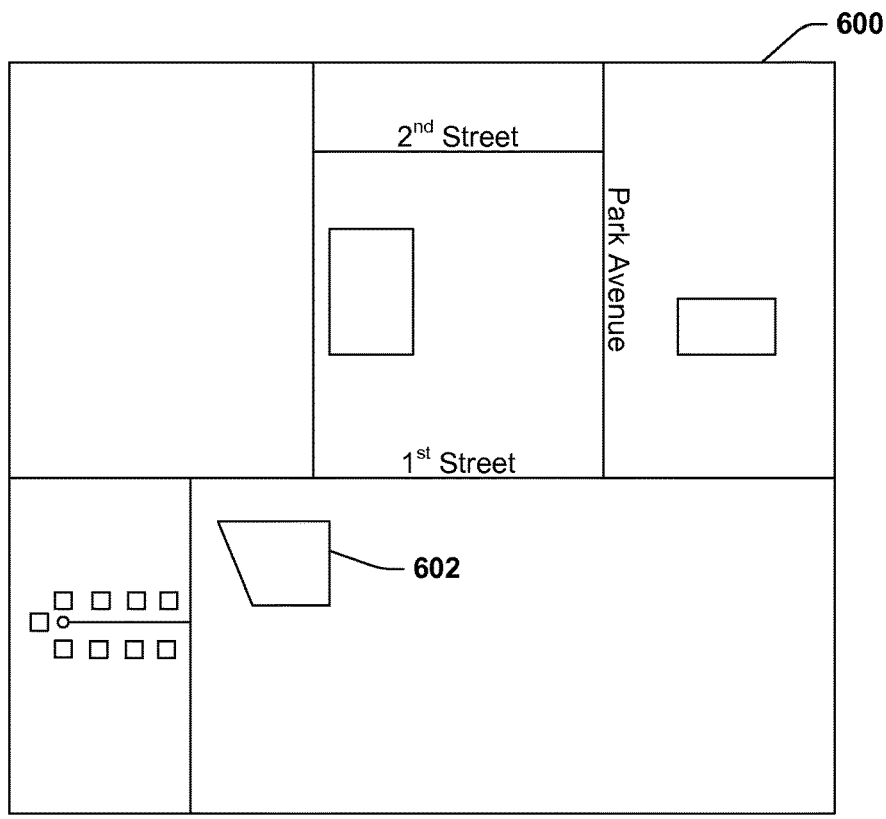
FIG. 6 illustrates an example visualization for viewing a criticality profile.
Figure 7:
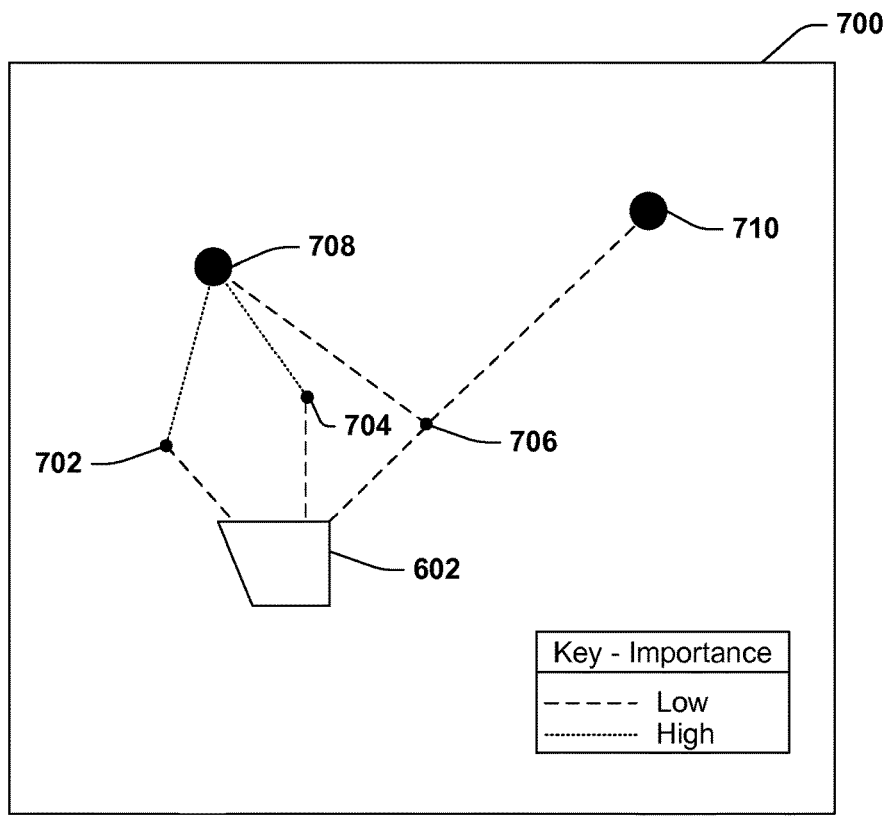
FIG. 7 illustrates an example visualization for viewing criticality profiles of interdependent industrial assets and structures in the environment served by the industrial assets.

Referring to FIGS. 6-7, an example interactive visualization is provided. During a first instance 600 of the visualization, as illustrated in FIG. 6, a geographic map may be provided depicting structures, such as homes, subdivisions, grocery stores, stadiums, etc. The user may interact with the geographic map to reveal dependencies between one or more structures illustrated in the geographic map and a power system and/or industrial assets thereof. By way of example, the user may navigate a cursor over a grocery store 602 and left-click, causing a second instance 700 of the visualization to be illustrated, as provided for in FIG. 7.

The second instance 700 may depict the grocery store 602 and industrial assets that the grocery store 602 depends upon for power (e.g., streets and other non-relevant structures have been hidden/removed from the second instance 600 to better illustrate such dependencies; however, in some embodiments, such streets and/or non-relevant structures may continue to be shown). For example, the second instance 700 may illustrate the grocery store's dependence on a first distribution transformer 702 and a second distribution transformer 704 that respectively feed power to the grocery store 602. The second instance 700 may also illustrate the grocery store's dependence on a switch 706 which feeds power to the grocery store 602. For example, in the illustrated embodiment, the grocery store's dependency on the first distribution transformer 702, the second distribution transformer 704, and the switch 706 are low (e.g., as illustrated by the dashed lines). Accordingly, if one of the transformers 702, 704 and/or the switch 706 fail, for example, there may be sufficient redundancy in the power system to continue operating the grocery store 602 as desired (e.g., although the importance of the other two industrial assets may increase).

The second instance 700 further illustrates dependencies between industrial assets that feed power to the grocery store 602 and other industrial assets. By way of example, the first distribution transformer 702 and the second distribution transformer 704 are heavily dependent upon a first substation 708 (e.g., where the heavy dependence is illustrated by the dotted lines). Accordingly, a failure of the first substation 708 may result in the first distribution transformer 702 and the second distribution transformer 704 experiencing an outage. As another example, the switch's dependency on the first substation 708 may be low because the switch 706 may receive power from a second substation 710 if the first substation 708 fails.

Although not shown in FIG. 7, in some embodiments, the dependency of the grocery store 602 on the first substation 708 and/or the second substation 710 may also be illustrated in such a visualization. For example, if the first substation 708 fails, two of the three power feeds to the grocery store 602 may fail (e.g., the first distribution transformer 702 and the second distribution transformer 704 may experience an outage). If the grocery store 602 cannot operate as desired with merely the feed provided through the switch 706, the grocery store 602 may be heavily dependent upon the first substation 708. Accordingly, in some embodiments, a line may be drawn between the first substation 708 and the grocery store 602 describing the heavy dependency of the grocery store 602 on the first substation 708, for example.

Figure 8:
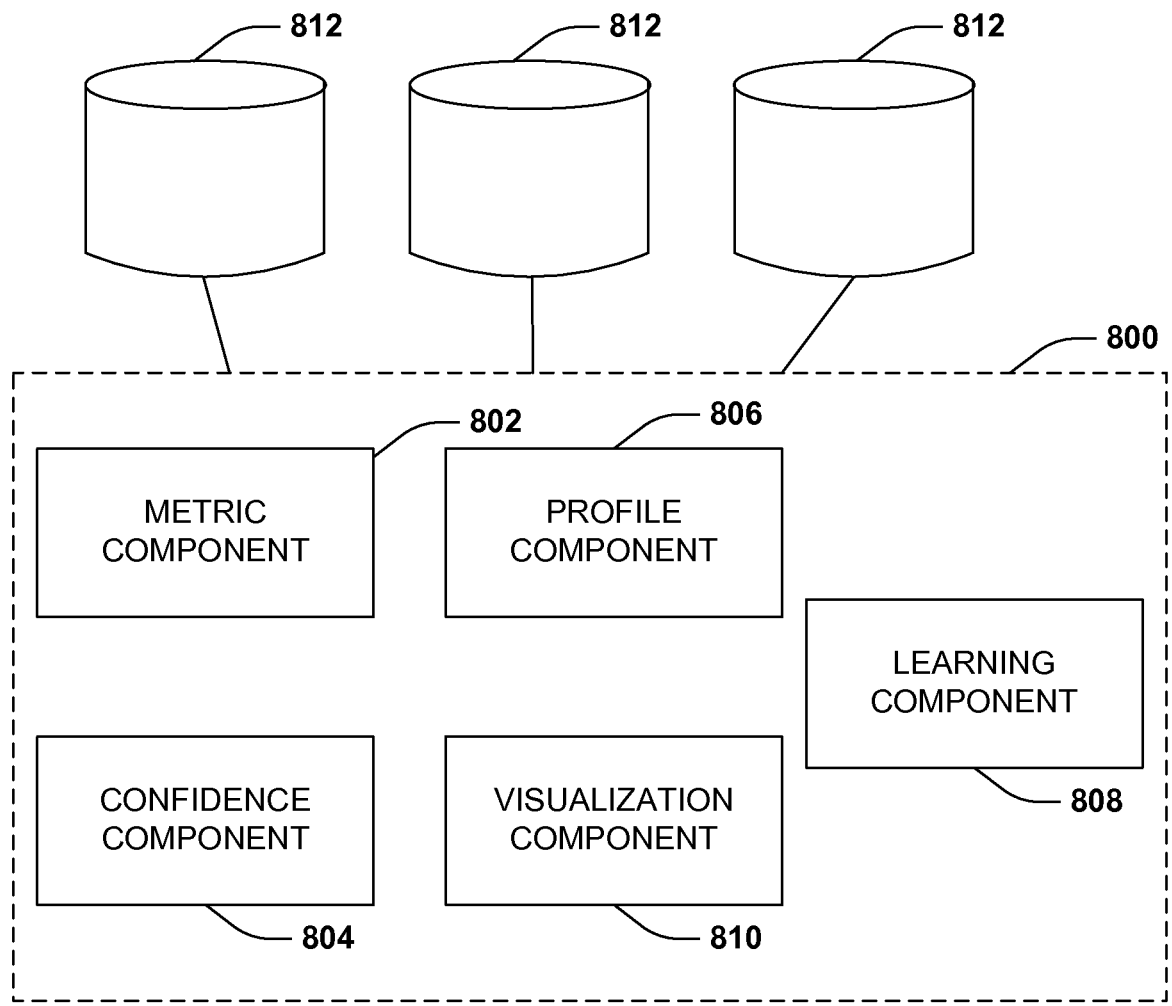
FIG. 8 is a component block diagram of an example system for developing a first criticality profile for a first industrial asset of a power system.

Referring to FIG. 8, a component block diagram of an example system 800 for developing a first criticality profile, such as according to the example method 100 of FIG. 1, for a first industrial asset of a power system is provided. In some embodiments, such a system 800 is implemented at least in part according to the logical diagram 200 of FIG. 2.

The example system 800 comprises a metric component 802 configured to determine one or more criticality metrics respectively describing an importance of the first industrial asset to the power system. In some embodiments, at least one of the criticality metrics includes an operation metric indicative of an operational impact if the first industrial asset remains in its current state, or switches from an operational state (e.g., where the first industrial asset is performing as desired) to a degraded state (e.g., where the first industrial asset is not performing as desired and/or has failed) or an improved state. In some embodiments, at least one of the criticality metrics includes a restoration metric indicative of a restoration impact to restore the first industrial asset to an operational state if the first industrial asset remains in an unchanged state or enters a degraded state and/or to improve the operations of the first industrial asset to the improved state. In some embodiments, at least one of the criticality metrics includes an interdependency metric indicative of a relationship between the first industrial asset and one or more other industrial assets, such as a second industrial asset, and/or indicative of a relationship between the first industrial asset and a structure in an environment served by the first industrial asset.

In some embodiments, the metric component 802 may determine one or more of the criticality metrics based upon user input. By way of example, a user may rate the operational impact of the first industrial asset on a scale of 1-10 and the metric component 802 defines the operation metric based upon the rating. In other embodiments, the metric component 802 may determine one or more of the criticality metrics based upon data yielded from one or more data stores 812. By way of example, the metric component 802 may use a machine learning algorithm to predict the restoration impact to restore the first industrial asset if the first industrial asset were to experience an outage based upon historical information regarding the complexity of restoring other industrial assets of a same class as the first industrial asset and/or having a similar operating environment (e.g., located in a similar topology, etc.).

The example system 800 also comprises a confidence component 804 configured to generate a confidence profile for one or more of the criticality metrics (e.g., if desired). Such a confidence profile may include a numerical score indicative of a confidence in the criticality metric (e.g., a confidence in how certain the restoration impact is) and/or a confidence matrix or formula describing how the confidence may vary over time, for example. In some embodiments, the confidence component 804 may determine confidence profiles based at least in part upon data yielded from one or more data stores 812.

The example system 800 also comprises a profile component 806 configured to develop a first criticality profile for the first industrial asset based upon the one or more criticality metrics and/or the one or more confidence profiles. In some embodiments, the profile component 806 may determine criticality profiles based at least in part upon data yielded from one or more data stores 812.

The example system 800 also comprises a learning component 808 configured to refine one or more algorithms and/or calculation approaches used by at least one of the metric component 802, confidence component 804, and/or profile component 806 to determine one or more criticality metrics, generate a confidence profile for one or more of the criticality metrics, and/or develop the first criticality profile. By way of example, the learning component 808 may receive data yielded from one or more data stores 812 which are indicative of actual and/or historical operational impacts, actual and/or historical restoration impacts, actual and/or historical interdependencies, actual and/or historical criticalities, and/or actual and/or historical decisions taken based upon the criticality and compare such information to calculated results to adjust a parameter of one or more algorithms and/or select a different calculation approach.

The example system 800 also comprises a visualization component 810 configured to develop a visualization of the first criticality profile, such as describing a relationship between the first industrial asset and one or more structures of an environment associated with the first industrial asset, describing a relationship between the first industrial asset and one or more other industrial assets, and/or describing how the importance of the first industrial asset changes over time.

Figure 9:
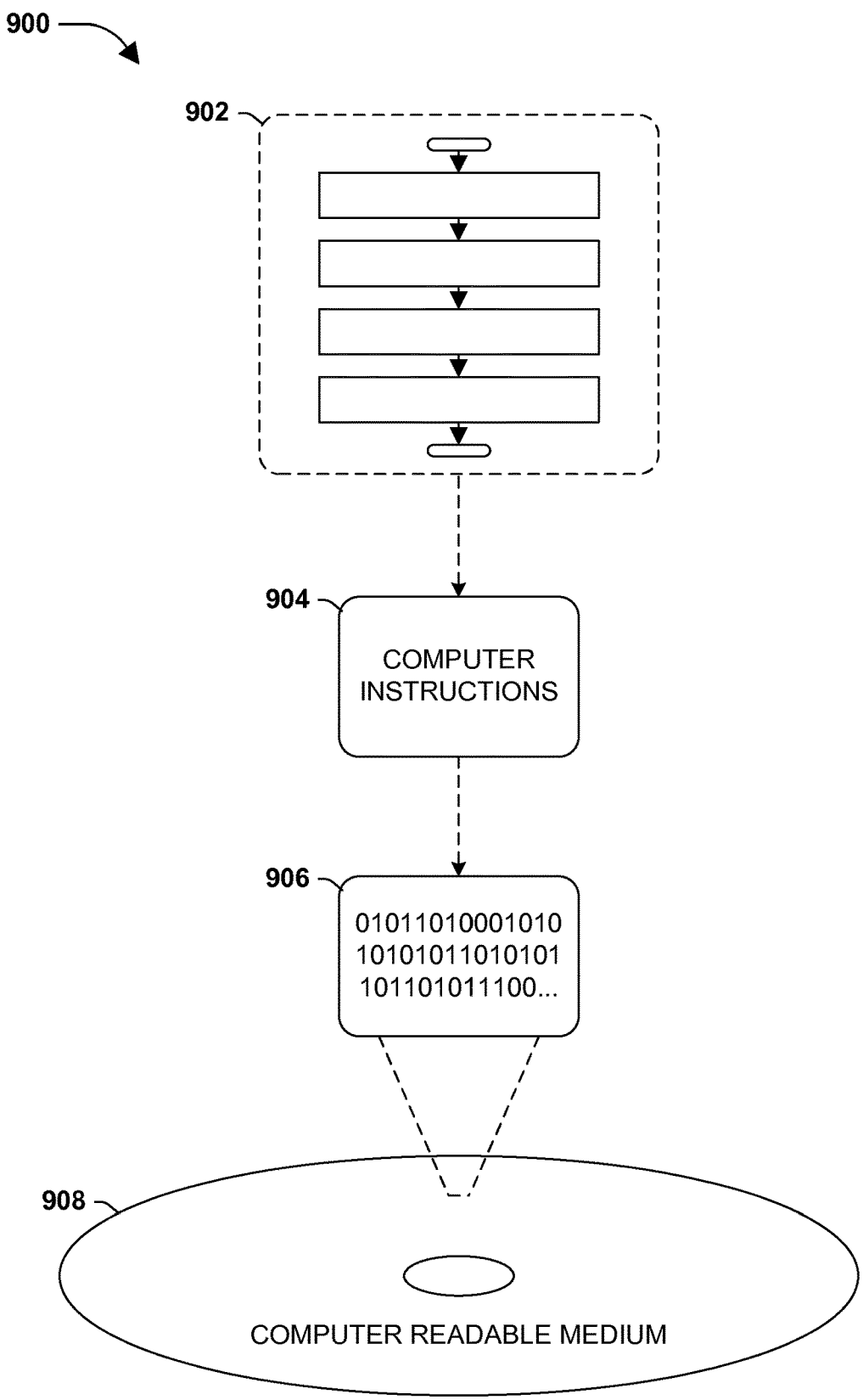
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example computer-readable medium that may be devised in these ways is illustrated in FIG. 9, wherein the implementation 900 comprises a computer-readable medium 908 (e.g., a flash drive, CD-R, DVD-R, application-specific integrated circuit (ASIC), field-programmable gate array (FPGA), a platter of a hard disk drive, etc.), on which is encoded computer-readable data 906. This computer-readable data 906 in turn comprises a set of processor-executable instructions 904 that when executed via a processing unit(s) is configured to operate according to one or more of the principles set forth herein. In some embodiments, the processor-executable instructions 904 may be configured to perform a method 902, such as at least some of the example method 100 of FIG. 1, for example. In other embodiments, the processor-executable instructions 604 may be configured to implement a system, such as at least some of the example logical diagram 200 of FIG. 2 and/or the example system 800 of FIG. 8, for example. Many such computer-readable media may be devised by those of ordinary skill in the art that are configured to operate in accordance with one or more of the techniques presented herein.

Figure 10:
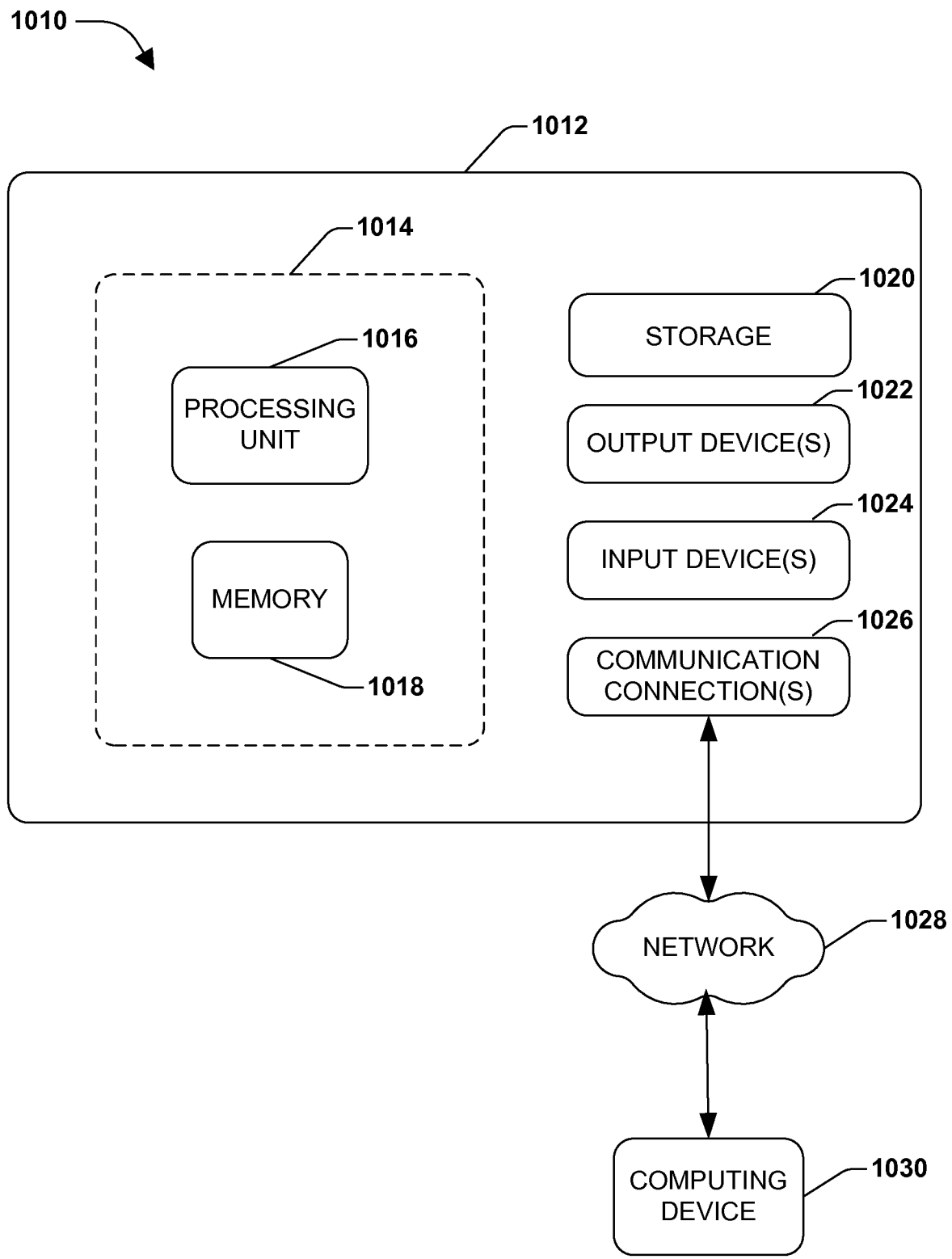
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example), or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD- ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, or the same channel.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same or different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    determining an operational metric indicative of an operational impact of a first industrial asset on a system comprising the first industrial asset;
    determining a restoration metric indicative of a change in a restoration impact, corresponding to a reduction in future restoration complexity corresponding to a budget, on the system associated with a completed modification of the first industrial asset to perform at an improved state different than a present state;
    developing a first criticality profile for the first industrial asset based upon the operational metric and the restoration metric;
    determining, using a processing unit, an allocation of maintenance resources for a plurality of industrial assets, including the first industrial asset, based upon the first criticality profile; and
    generating a visualization based upon the first criticality profile for the first industrial asset, the visualization comprising a diagram comprising a representation of the first industrial asset, a representation of a first structure associated with the first industrial asset and a representation of a second structure associated with the first industrial asset,
    a first line in the diagram connecting the representation of the first industrial asset to the representation of the first structure and graphically indicative of a first level of reliance that the first structure has on the first industrial asset based upon at least one of a first pattern or a first weight applied to the first line, and
    a second line in the diagram connecting the representation of the first industrial asset to the representation of the second structure and graphically indicative of a second level of reliance that the second structure has on the first industrial asset based upon at least one of a second pattern or a second weight applied to the second line, the first pattern different than the second pattern, the first weight different than the second weight, the first level of reliance different than the second level of reliance.

2. The method of claim 1, comprising:
    determining an interdependency metric indicative of an interdependency impact between the first industrial asset and a second industrial asset, wherein the developing a first criticality profile comprises:
        developing the first criticality profile based upon the interdependency metric.

3. The method of claim 1, wherein the developing a first criticality profile comprises:
    applying a first transformation to the operational metric and a second transformation to the restoration metric, the first transformation different than the second transformation, at least one of the first transformation or the second transformation comprising a conversion from a first quantification to a second quantification.

4. The method of claim 1, comprising:
    generating a first confidence profile of the operational metric; and
    generating a second confidence profile of the restoration metric, wherein the developing a first criticality profile comprises:
        applying a first transformation to the operational metric and a second transformation to the restoration metric, the first transformation a function of the first confidence profile and the second transformation a function of the second confidence profile, at least one of the first transformation or the second transformation comprising a conversion from a first quantification to a second quantification.

5. The method of claim 1, wherein the operational metric is indicative of the operational impact if the first industrial asset at least one of:
    switches between an operational state and a degraded state; switches between the operational state and the improved state; or remains in the operational state.

6. The method of claim 5, wherein the degraded state is a failed state.

7. The method of claim 1, wherein the restoration impact corresponds to restoring the first industrial asset to an operational state from a degraded state.

8. The method of claim 1, comprising:
    determining an interdependency metric indicative of an interdependency impact between the first industrial asset and an environment associated with the first industrial asset, wherein the developing a first criticality profile comprises:
        developing the first criticality profile based upon the interdependency metric.

9. The method of claim 1, wherein the generating a visualization comprises:
    generating the visualization for a future point in time.

10. The method of claim 1, wherein the representation of the first industrial asset is different than the representation of the first structure and the representation of the second structure.

11. The method of claim 1, wherein the representation of the first structure is different than the representation of the second structure.

12. The method of claim 1, the reduction in future restoration complexity corresponding to a change in timing associated with the first industrial asset.

13. The method of claim 1, the first pattern applied to the first line and the second pattern applied to the second line.

14. The method of claim 1, the first weight applied to the first line and the second weight applied to the second line.

15. A system, comprising:
    one or more processing units; and
    memory comprising instructions that when executed by at least one of the processing units perform operations, comprising:
        determining an operational metric indicative of an operational impact of a first industrial asset on a system comprising the first industrial asset;
        determining a restoration metric indicative of a change in a restoration impact, corresponding to a reduction in future restoration complexity corresponding to a budget, on the system associated with a completed modification of the first industrial asset to perform at an improved state different than a present state;

developing a first criticality profile for the first industrial asset based upon the operational metric and the restoration metric;

determining an allocation of maintenance resources for a plurality of industrial assets, including the first industrial asset, based upon the first criticality profile; and generating a visualization based upon the first criticality profile for the first industrial asset, the visualization comprising a diagram comprising a representation of the first industrial asset, a representation of a first structure associated with the first industrial asset and a representation of a second structure associated with the first industrial asset;

a first line in the diagram connecting the representation of the first industrial asset to the representation of the first structure and graphically indicative of a first level of reliance that the first structure has on the first industrial asset based upon at least one of a first pattern or a first weight applied to the first line, and a second line in the diagram connecting the representation of the first industrial asset to the representation of the second structure and graphically indicative of a second level of reliance that the second structure has on the first industrial asset based upon at least one of a second pattern or a second weight applied to the second line, the first pattern different than the second pattern, the first weight different than the second weight, the first level of reliance different than the second level of reliance.

16. The system of claim 15, wherein the operational metric is indicative of the operational impact if the first industrial asset at least one of:

switches between an operational state and a degraded state; switches between the operational state and the improved state; or remains in the operational state.

17. The system of claim 15, wherein the restoration impact corresponds to restoring the first industrial asset to an operational state from a degraded state.

18. The system of claim 15, the operations comprising: determining an interdependency metric indicative of an interdependency impact between the first industrial asset and a second industrial asset, wherein the developing a first criticality profile comprises:

developing the first criticality profile based upon the interdependency metric.

19. The system of claim 15, the operations comprising: responsive to the first criticality profile indicating that the first industrial asset is of greater importance to the system than a second industrial asset, prioritizing maintenance of the first industrial asset over maintenance of the second industrial asset.

20. A non-transitory computer readable medium comprising processor-executable instructions that when executed perform a method comprising:

determining an operational metric indicative of an operational impact of a first industrial asset on a system comprising the first industrial asset;

determining a restoration metric indicative of a restoration impact of the first industrial asset on the system;

developing a first criticality profile for the first industrial asset based upon the operational metric and the restoration metric;

determining, using a processing unit, an allocation of maintenance resources for a plurality of industrial assets, including the first industrial asset, based upon the first criticality profile; and generating a visualization based upon the first criticality profile for the first industrial asset, the visualization comprising a diagram comprising a representation of the first industrial asset, a representation of a first structure associated with the first industrial asset and a representation of a second structure associated with the first industrial asset, a first line in the diagram connecting the representation of the first industrial asset to the representation of the first structure and graphically indicative of a first level of reliance that the first structure has on the first industrial asset based upon at least one of a first pattern or a first weight applied to the first line, and a second line in the diagram connecting the representation of the first industrial asset to the representation of the second structure and graphically indicative of a second level of reliance that the second structure has on the first industrial asset based upon at least one of a second pattern or a second weight applied to the second line, the first pattern different than the second pattern, the first weight different than the second weight, the first level of reliance different than the second level of reliance.

* * * * *